United States Patent [19]  
Cox

[11] 3,804,300  
[45] Apr. 16, 1974

[54] BATCH ADMIXTURE METERING CONTROL
[75] Inventor: Edgar R. Cox, Smithfield, Tex.
[73] Assignee: Texas Industries, Inc., Dallas, Tex.
[22] Filed: Sept. 11, 1972
[21] Appl. No.: 287,865

[52] U.S. Cl. .................... 222/67, 222/135, 222/148
[51] Int. Cl. ............................................. B67d 5/08
[58] Field of Search ............. 222/51, 64, 65, 66, 67, 222/68, 76, 129.3, 129.4, 132, 135, 148, 425, 434, 450, 478, 481, 482; 259/154; 73/308, 313, 321

[56] References Cited
UNITED STATES PATENTS
3,402,852   9/1968   Jones ............................. 222/148 X
3,435,989   4/1969   Lorenzen ......................... 222/51 X
3,402,851   9/1968   Ciotti et al. ..................... 222/76 X Primary Examiner—Stanley H. Tollberg
Assistant Examiner—Larry Martin
Attorney, Agent, or Firm—Richards, Harris & Medlock

[57] ABSTRACT
Disclosed is an apparatus for selectively measuring liquids from a plurality of sources and dispensing the liquids into a mixing tank. The apparatus has a plurality of storage tanks for holding various types of liquids. These storage tanks are independently connected through suitable conduits, valves and pumps to a measuring chamber. A float is positioned in the chamber and is connected by a chain to a rotatable disk, to rotate the disk as the position of the float varies within the chamber due to the addition of liquids therein. The disk is provided with a plurality of radially spaced natural magnets which periodically close a mercury switch to generate electrical pulses as the volume of liquid in the chamber increases. A pulse counter and control circuit is connected to the reed switch to close the inlet valve and de-energize the inlet pump. A plurality of outlet conduits, valves and pumps are connected to the chamber to convey the fluids from the chamber to a mixing tank. The operation of these outlet valves and pumps is controlled by the control circuit to discharge the liquid from the chamber when the desired volume is present. A wash water, inlet valve is also connected to the chamber to rinse the interior of the chamber between successive dispensing cycles. A drain and drain valve are provided to remove the rinse water from the chamber.

13 Claims, 4 Drawing Figures 3,804,300

BATCH ADMIXTURE METERING CONTROL

BACKGROUND AND SUMMARY OF THE INVENTION

The present invention relates to measuring and dispensing apparatus and more particularly to a new and improved measuring and dispensing apparatus which measures and dispenses various liquids from a plurality of sources with a maximum of accuracy and a minimum amount of cross contamination between the liquids.

In the production of large quantities of concrete for various uses, it has been a general practice to employ a central mixing plant which is automatic in operation and into which various types and mixtures of concrete are prepared and transferred to trucks to be transported to the places of use. In this automatic mixing operation, it has been common to add a variety of liquid admixtures to the concrete to produce concretes of various desired qualities. Some of these admixtures are utilized for example: to either accelerate or retard the setting time of the concrete; to reduce the amount of water retained in the concrete; to cause the formation of air in the concrete; to increase the density of the concrete; to add color; and to reduce shrinkage and the like. It is to be noted that each of the admixtures varies in the amount which must be added to each mixture depending upon the particular admixture to be used, the quantity of the concrete to be mixed, and the degree of desired variations in the quality of the resultant concrete products. It is also important to note that in many cases successive batches of concrete produced by the mixing plant will have different requirements and will require different quantities of admixtures in each. Therefore, it can be seen that it is important for dispensing apparatus used with admixtures to automatically and accurately dispense admixture liquids from a plurality of sources with a minimum amount of cross contamination between the admixtures.

The general purpose of this invention is to provide an improved measuring and dispensing apparatus which accurately and automatically dispenses liquids from a plurality of sources with a minimum amount of contamination. To attain this, the present invention contemplates the use of an improved arrangement of a measuring and dispensing chamber whereby high accuracy and low contamination is obtained.

An object of the present invention is the provision of an improved automatic measuring and dispensing apparatus.

Another object of the present invention is the provision of the improved measuring and dispensing apparatus which accurately dispenses liquids from a plurality of sources.

A further object of the invention is the provision of an improved measuring and dispensing apparatus which dispenses liquids from a plurality of sources with a minimum amount of contamination.

Still another object of the present invention is the provision of the improved measuring and dispensing apparatus which is simple and inexpensive to manufacture and operate.

Other objects and many of the attendant advantages of this invention will be readily appreciated by those of ordinary skill in the art as the same becomes better understood by reference to the following Detailed Description when considered in connection with the accompanying Drawings in which:

DESCRIPTION OF THE PREFERRED EMBODIMENTS

Figure 1:
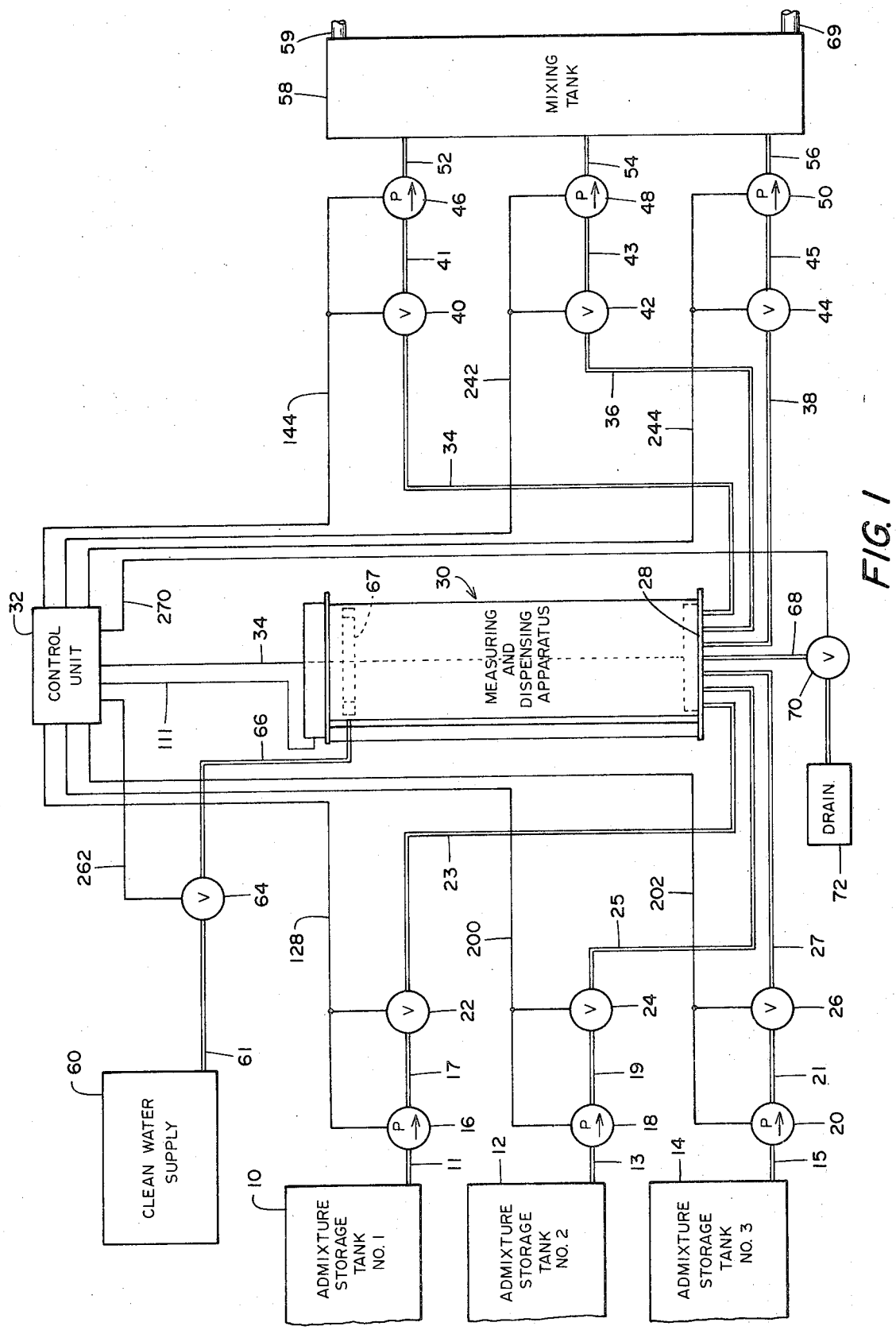
FIG. 1 illustrates a diagram view of a preferred embodiment showing the measuring and dispensing apparatus connected to a plurality of admixture storage tanks and a concrete mixing tank.

Referring now to the Drawings, wherein like reference characters designate like or corresponding parts throughout the several views, there is shown in FIG. 1 a portion of a concrete plant with a batch admixture measuring and dispensing system for selectively measuring and dispensing desired volumes of liquid individually from a plurality of admixture storage tanks or the like and dispensing these measured liquids into a mixing tank with a high degree of accuracy and with a minimum amount of contamination. The admixture storage tanks each contain a separate admixture liquid. The mixing tank would normally contain the water to be added to the concrete, and thus by dispensing the various admixtures into the mixing tank the admixtures are added to the concrete.

As can be seen, the system is illustrated with three storage tanks 10, 12 and 14 for use in holding a large volume of admixture liquid. These tanks are provided with openings for allowing the addition of admixture liquid and in the preferred embodiment have a capacity of from 500 to 1,000 gallons. For purposes of disclosure of the present invention only three tanks are shown, but it is to be understood, of course, that the principles as disclosed in the present invention could be used with more than three admixture storage tanks as is desired. Each of the tanks 10, 12 and 14 are connected by suitable fluid conduits 11, 13 and 15 respectively to pumps 16, 18 and 20. In the present embodiment these conduits and other conduits throughout the system are 1 inch diameter tubing of polyvinylchloride material, but it is to be understood of course that other diameters and materials could be used. Also in the present embodiment, the inlet pumps 16, 18 and 20 are powered by electrical current and are selectively operable so that they may be operated as desired to pump fluid from the admixture storage tanks into the conduit system. These pumps and the other pumps used throughout the system were one and one half horsepower pumps manufactured by Deming Pump Inc. and identified by FIG. No. 4352 unit No. 922.

Connected by means of conduits 17, 19 and 21 respectively to the discharge side of the inlet pumps 16, 18 and 20, are inlet valves 22, 24, and 26. These valves are of a ball valve type and are selectively operated by a double-acting pneumatic cylinder which will be hereinafter described in more detail. In the present embodiment, the valves are of the ball valve type to assist in severing during closing of the valve any fibers which may be present in the admixtures. It is to be understood of course that other types of valves could be utilized which would effectively operate with the particular admixtures used. In the present embodiment these valves are of the type which are commonly available and are manufactured by Smith, Inc. and have a part number 50361.

Each of the inlet valves 22, 24 and 26 are connected through separate conduits 23, 25 and 27 respectively to a manifold 28 of the measuring and dispensing apparatus 30. This manifold 28 communicates with an interior chamber of the apparatus 30. It can be seen that by selectively operating the inlet pumps and valves, admixture fluid can be selectively dispensed from tanks 10, 12 and 14. The operation of each of the inlet valves and pumps is controlled by the control unit 32 which can individually actuate each of the pump and valve pairs for the respective admixture tanks to selectively supply that particular admixture to the apparatus 30. The details of the control unit will be hereinafter described in detail with reference to FIG. 4. The measuring and dispensing apparatus 30, as will be hereinafter described in more detail is provided with means for sensing the amount of fluid contained in the chamber. This information is then transmitted to the control unit 32 by means of electrical conductor 34. The control unit 32 will in turn deactuate and close the appropriate inlet pump and valve when a preselected volume is present in the measuring and dispensing apparatus 30.

The manifold 28 of the measuring and dispensing apparatus 30 is also provided with separate discharge conduits for each of the separate admixture liquids. Discharge conduit 34 is provided for the admixture liquid of storage tank 10 while discharge conduits 36 and 38 are provided for the admixture liquids from storage tanks 12 and 14, respectively. Discharge valves 40, 42, and 44 are connected, respectively, to the discharge conduits 34, 36, and 38 to control the flow in each of these conduits. Each of the valves 40, 42, and 44 are connected by separate fluid conduits 41, 43, and 45, respectively, to discharge pumps 46, 48, and 50. Each of the discharge pumps 46, 48, and 50 are connected, respectively, by fluid conduits 52, 54, and 56 to a mixing tank 58. Each of the valve and pump pairs connected to the conduits 34, 36, and 38 are operatively connected to the control unit 32 so that the control unit can be used to open the discharge valves and energize the discharge pumps to dispense liquid from the measuring and dispensing apparatus 30 into the mixing tank 58 through the conduit system.

The mixing tank 58 is provided with a water inlet line 59 to allow desired volumes of water to be placed in the tank, and in the preferred embodiment this tank had a capacity of 241 gallons. The tank is also provided with suitable means such as a scale (not shown) for measuring the amount of water contained in the tank. The tank is also provided with a water discharge conduit 69 which is connected to the concrete mixing chamber. Thus, it can be seen that the admixture is added to the water in tank 58 and is thereafter dispensed into the concrete through conduit 69.

A clean water supply 60 is provided for cleaning the interior of the measuring and dispensing apparatus 30 between successive measuring and dispensing operations of different admixture liquids. This clean water supply 60 is connected through fluid conduit 61 to a selectively operable supply valve 64. This supply valve 64 is in turn connected by a suitable fluid conduit 66 to a cleaning discharge manifold 67 located in the upper portion of the measuring and dispensing apparatus 30. This cleaning discharge manifold 67 has a plurality of ports therein (not shown) arranged to direct clean water against the interior walls of the chamber 80 to wash the admixture therefrom. These ports are arranged so that the water ejected therefrom will have both tangential and vertically downward vectors of velocity to cause the water to swirl around the interior of the cylindrical body. The structure and operation of this cleaning discharge manifold will be hereinafter described in more detail, but for present purposes it is sufficient to note that the manifold will direct the flow of water along the interior surface of the chamber within the measuring dispensing apparatus 30 to rinse the admixture therefrom. The supply valve 64 is electrically connected to control unit 32 so that the pump can be actuated and the valve opened to supply clean water through conduit 66 as required. The manifold 28 is provided with a drain conduit 68 for receiving the mixture of clean water and material washed from the interior of the chamber in the measuring and dispensing apparatus 30. A selectively operable drain valve 70 is connected to the conduit 68 to control the flow of liquid through the conduit 68 to a drain 72. This valve 70 is electrically connected to a control unit 32 to allow the fluid to drain from the measuring and dispensing apparatus 30 during the rinse operation.

Figures 2, 3:
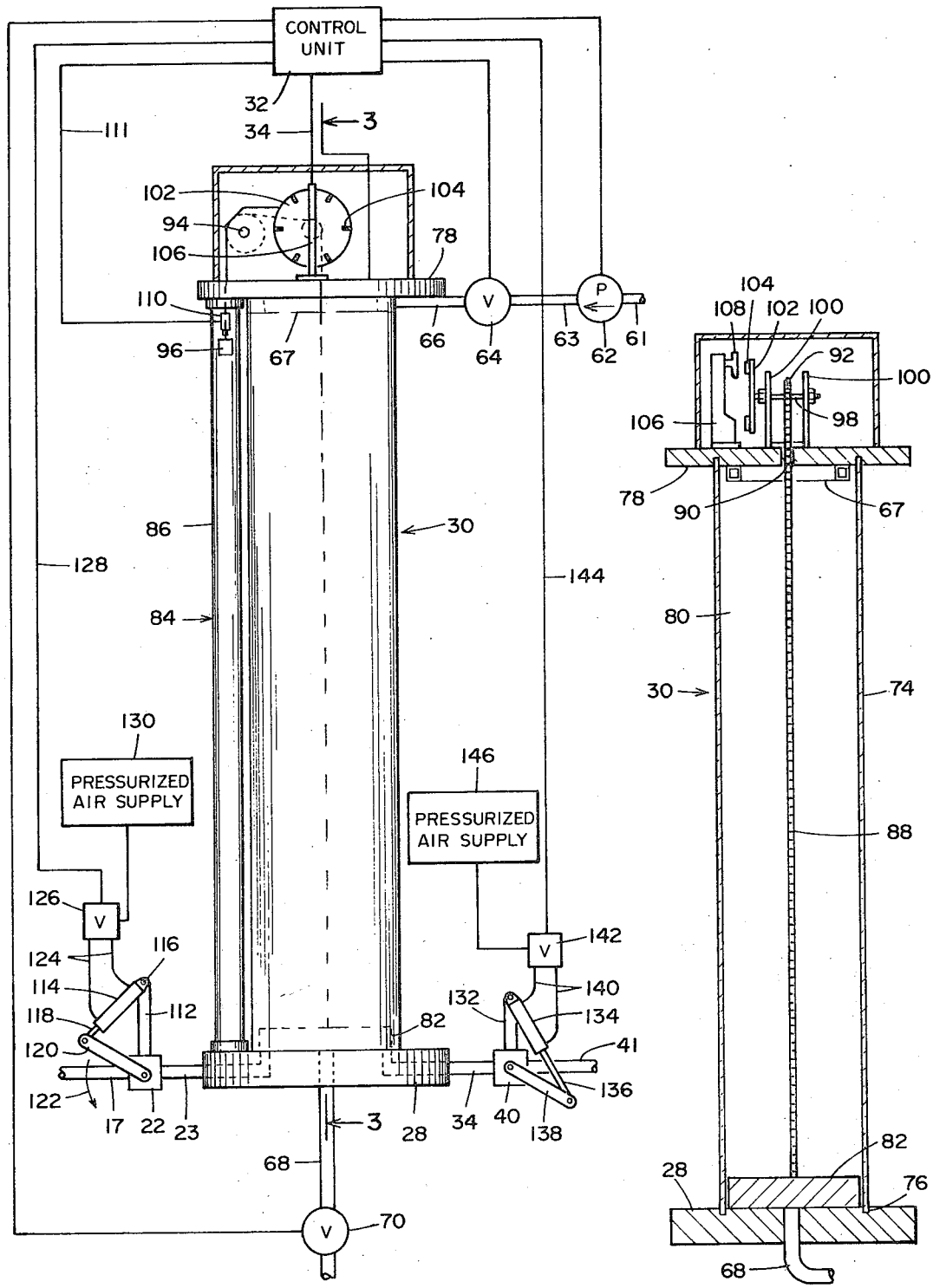
FIG. 2 is an enlarged view of the measuring and dispensing apparatus illustrated in FIG. 1.
FIG. 3 illustrates the section of the measuring and dispensing apparatus taken on line 3—3 of FIG. 2 looking in the direction of the arrows.

Referring now to FIGS. 2 and 3, the details of the measuring and dispensing apparatus 30 will be described. The measuring and dispensing apparatus 30 has a cylindrical body 74 which has one end seated in an annular groove 76 in the manifold 28. This cylindrical body 74 has its upper end attached to a plate 78. The cylindrical body 74, manifold 28 and plate 78 define a cylindrical chamber 80. The body 74 is preferably constructed from a transparent material such as clear acrylic, glass, or the like of sufficient strength to withstand the fluid pressures present during measuring and dispensing of the admixture liquids. In the preferred embodiment the chamber had a maximum volume of 240 ounces, but it is anticipated that other sizes could be used.

The manifold 28 is provided with a plurality of ports which communicate with the bottom of the chamber 80. In the present embodiment, ports are provided for each of the conduits 23, 25, 27, 68, 34, 36, and 38, but in FIGS. 2 and 3, only conduits 23, 68, and 34 are illustrated. Conduits 23 and 34 comprise the intake and outlet conduits, respectively, for admixture storage tank number 1, but it is to be understood of course that the intake and outlet conduits for the other admixture storage tank would be similarly attached to the manifold 28.

A float 82 is positioned within the cylindrical chamber 80 and is of such a size and shape that it will axially move along the length of the chamber 80 without interfering with the walls thereof. This float 82 has a density such that it will be supported on the surface of the admixture liquids as they flow into the cylindrical chamber 80 through the inlet ports. Adjacent to the body 74 is a second cylindrical body 84 which is likewise constructed from transparent material and has an axially extending chamber 86 therein. This second cylindrical body 84 is supported between the manifold 28 and the plate 78 in a manner similar to the body 74. A chain 88 has one end attached to the float 82 and extends up through an opening 90 in the plate 78. This chain engages a sprocket 92, an idler pulley 94 and has a counter weight 96 attached to the other end thereof. This counter weight 96 is positioned within the chamber 86 of the second cylindrical body 84.

The sprocket 92 is fixed to rotate with a shaft 98. The shaft 98 is rotatably mounted by suitable bearings between parallel extending support brackets 100. Fixed to one end of the shaft is a disc 102 which has a plurality of permanent magnets 104 radially spaced about the periphery of the disc 102. These magnets 104 are arranged with adjacent magnets having opposite polarity to prevent the creation of a uniform field in the vicinity of the disc 102.

A bracket 106 is attached to the upper surface of the plate 78 adjacent the disc 102 and a mercury switch 108 is mounted on the bracket 106. As the disc 102 is rotated and the magnets 104 move past the switch 108, the switch 108 will be selectively closed as each magnet passes the switch. This mercury switch is electrically connected to the control unit by conductor 34 for purposes that will be hereinafter described.

In operation as fluid enters the cylindrical chamber 80 the float 82 will be forced to float on the surface of the admixture thus allowing the counter weight 96 to pull the chain 88 over the idler pulley 94 and in turn rotating the sprocket 92 which in turn rotates the shaft 98 and disc 102. This rotation of the disc 102 will in turn open and close the switch 108 creating electrical pulses in the conductor 34 which are transmitted into the control unit 32.

A reed switch 110 is located in the upper extremity of the chamber 86. This switch 110 is electrically connected to control unit 32 through conductor 111 and is positioned to be actuated by a magnet (not shown) on the counterweight 96, when the float 82 is at the bottom of chamber 86. By use of this switch 110 an electrical signal can be conducted to the control unit when fluid is absent from the chamber 86.

In FIG. 2 typical valve configurations are shown with respect to valves 22 and 40. It is to be understood that the other valves in the system can be operated in the same manner. As can be seen in FIG. 2, the inlet valve 22 has a support bracket 112 which extends therefrom. A double-acting pneumatic cylinder 114 has one end pivotally attached to the bracket 112 at 116 and has the telescoping piston rod 118 pivotally attached to the actuation arm 120 of the valve 22. In the present embodiment the cylinder is a double-acting type manufactured by Schrader Valve, Inc. having model number 200-00-30. The valve 22 is shown in FIG. 2 in its closed position, but by appropriately operating the cylinder 114, the actuation arm 120 can be rotated in a counterclockwise direction as represented by arrow 122 to open the valve and allow fluid to flow from the admixture storage tank 10 into the measuring and dispensing apparatus 30. The cylinder 114 is connected by hydraulic lines 124 to a control valve 126. This valve 126 is manufactured by Parker Hanifin, Inc. port No. GG 200-2 -501 and is the type which opens and closes in response to an electrical current supplied through conductor 128 from control unit 32 to selectively supply pressurized air from 130 to either side of the piston in the cylinder 114. By assembling the piston in the manner shown, the control unit 32 can be utilized to open and close the valve 22 as desired.

In a likewise manner, valve 40 is provided with a bracket 132, a cylinder 134, a piston rod 136, an actuation arm 138, hydraulic lines 140, a valve 142, an electrical control line 144, and air supply 146 which are identical in operation to valve 22. Thus it can be seen that the valve 22 and the valve 40 can be regulated to cause admixture liquid to flow into the measuring and dispensing apparatus 30 and thereafter to be dispensed therefrom through conduit 34.

Figure 4:
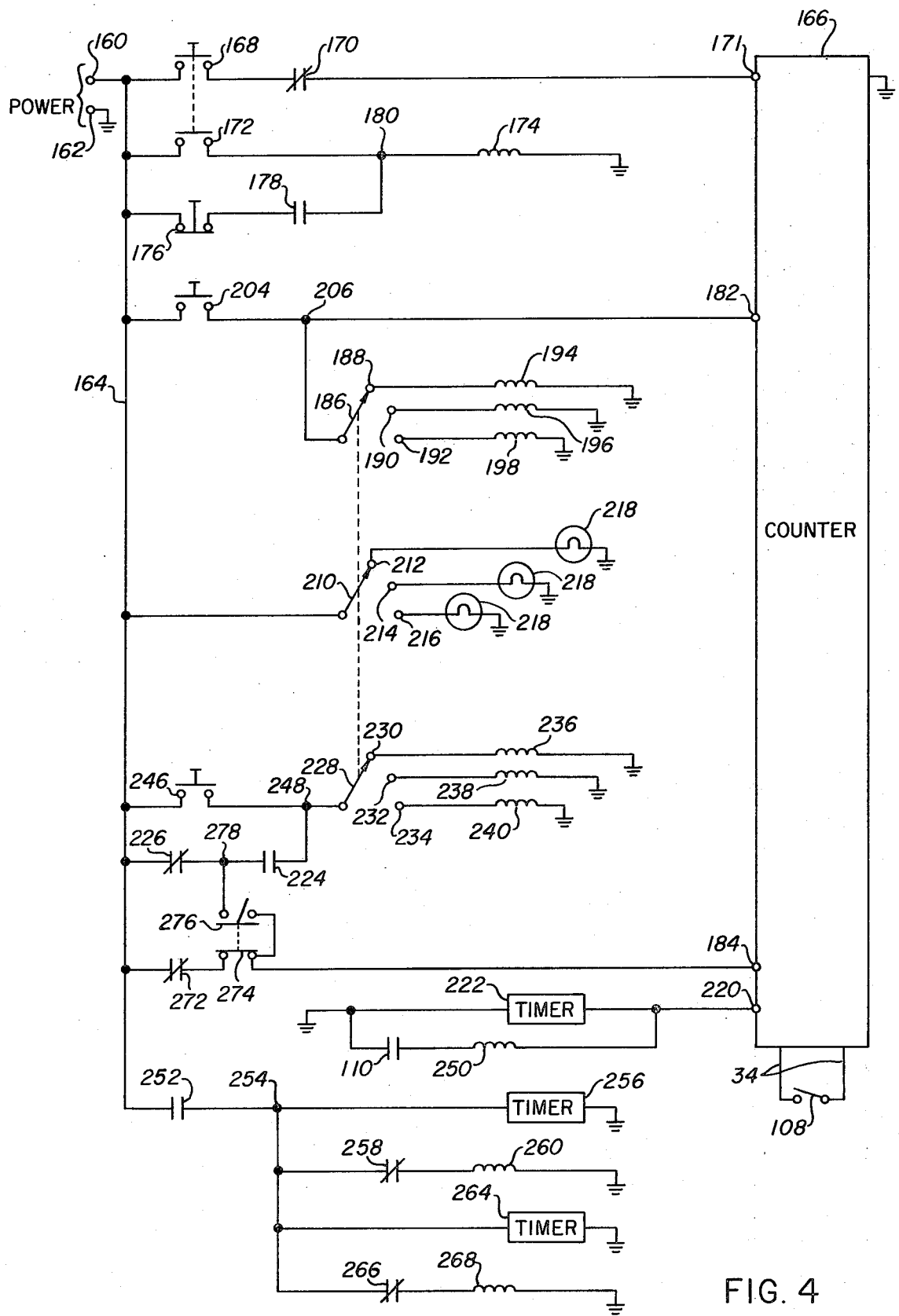
FIG. 4 illustrates a schematic diagram of the control unit.

Referring to FIG. 4 the details of the structure of the control unit 32 will be described. The unit is provided with 110 volt alternating current power between points 160 and 162. Point 160 is connected to a bus bar 164, while point 162 is connected to ground. A counter unit 166 is connected in series to the bus bar 164 through normally opened push button switch contacts 168 and normally closed relay contacts 170. The counter unit 166 used in the embodiment is manufactured by Automatic Temperature Controls Inc. and has part number 326A350A10PX. The control relays utilized throughout the circuit are sold by Potter Brumfield and have part number CHB-38-70003.

The switch contacts 168 are mechanically connected to a second set of normally opened switch contacts 172 so that both sets of contacts will close simultaneously. The switch contacts 172 are connected in series with relay coil 174 between the bus bar 164 and ground. A normally closed set of switch contacts 176 and a normally open set of relay contacts 178 are connected in series between the bus bar 164 and point 180. The relay contacts 170 and 178 are controlled by the relay coil 174 and thus when the switch contacts 168 and 172 are closed, relay coil 174 closes contacts 178 to retain power on relay coil 174. This operation simultaneously opens contacts 170 as the power is applied to point 171 on the counter 166, which in turn closes an internal relay in the counter which connects point 182 to the bus bar 164 through point 184 on the counter.

Point 182 is connected to a first of three wipers 186 of a selector switch. In the present embodiment the selector switch is shown with three contacts 188, 190 and 192 to which the wiper 186 can be selectively engaged. Relay coils 194, 196, and 198 are connected between ground and points 188, 190 and 192, respectively. The contacts (not shown) of relay 194 are connected so that when the relay is actuated electrical power will be supplied through line 128 (FIG. 2) to open valve 22 and energize the pump 116 to supply admixture liquid from tank 10 to the measuring and dispensing apparatus 30. In a likewise manner, the contacts of relay 196 when actuated will supply powers to line 200 to open valve 24 and energize pump 18 while the contacts of relay 198 will supply power to line 202 and open valve 26 and energize pump 20. Thus it can be seen by appropriately setting the selector switch 186 on either contact 188, 190 or 192 that fluid can be selectively dispensed from either admixture tank 10, 12 or 14 respectively. In addition, a normally open push button switch 204 is connected between the bus bar 164 and point 206. This switch 204 when depressed will provide for manual operation of the inlet valves and pumps as desired.

A second wiper 210 is mechanically connected to wiper 186 and is also provided with three separate contacts 212, 214, and 216. Each of these contacts 212, 214, and 216 is connected to the ground through indicator lights 218. These indicator lights are located on the exterior of the control unit in a position convenient for viewing by the operator so that illumination of an appropriate light 218 will indicate to the operator which of the admixture tank systems is in operation.

During the dispensing operation the selector switch 186 will be appropriately set to remove liquid from the appropriate admixture tank and switch 168 will be momentarily closed, to in turn actuate the relay in the counter 166 to supply power to point 182 and relay coil 194. This will energize the appropriate inlet pump and valve to supply admixture liquid to the measuring and dispensing apparatus 30. The admixture liquid will then flow into the measuring and dispensing apparatus and due to the operation of the float 82, chain 88, and switch 108, pulses will be conducted to the counter 166 through line 34. The counter 166 is provided with circuitry which will count the pulses and upon completion of the desired number of pulses will remove power from point 182 to in turn de-energize the appropriate inlet pump and valve. Simultaneously with the removal of power from point 182 the counter 166 will supply power to point 220. A timer 222 is connected between point 220 and ground so that upon the application of power to point 220 the timer is energized. This timer is normally set to delay for a period of five seconds and thereafter close contacts 224. Contacts 224 are connected in series with normally closed relay contacts 226 between the bus bar 164 and a third wiper 228. This wiper 228 is mechanically connected to wipers 186 and 210 and is provided with three contact points 230, 232, and 234, which are in turn connected through relay coils 236, 238, and 240, respectively, to ground. These coils 236, 238, and 240 when energized close power relay contacts (not shown) which supply power to lines 144, 242, and 244, respectively to open and energize the appropriate discharge valves and pumps. Thus it can be seen that upon completion of the filling cycle the appropriate discharge valve and pump will be energized to remove liquid from the measuring and dispensing apparatus 30 and convey the same to the mixing tank 58. A normally opened push button switch 246 is connected between the bus bar 164 and point 248 to supply current to the wiper 228 when it is desired to manually operate the discharge system.

As has been previously described upon completion of the discharge of all the liquid from the measuring and dispensing apparatus 30 a normally opened zero switch 110 will close and energize relay coil 250. Relay coil 250 when energized will open normally closed contacts 226 to remove power from point 248 and in turn de-energize the appropriate discharge pump and close the appropriate discharge valve to complete the discharge cycle.

In addition, the energizing of coil 250 closes normally open contacts 252 to initiate the wash cycle. These contacts 252 are connected between the bus bar 164 and point 254. A timer 256 which is connected between point 254 and ground is energized upon the closing of contacts 252. This timer 256 has normally closed contacts 258 which are connected in series with relay coil 260 between point 254 and ground. Relay coil 260 when energized will close an appropriate contact to supply power to line 262 which opens the valve 64 to allow the clean water to flow into the measuring and dispensing apparatus 30. In a likewise manner, a timer 264 is connected between point 254 and ground and is energized upon the closing of contacts 252. The timer 264 has normally closed contacts 266 which are connected in series with relay coil 268 between point 254 and ground. The relay coil 268 has appropriate contacts not shown which upon energizing of the coil 268 will supply power to line 270 to open the discharge valve 70 and allow the water to flow from the measuring and dispensing apparatus 30 into the drain 72. The timer 264 has normally closed contacts 272 which are connected in series to the contacts of a normally closed switch 274 and the bus bar 164. The contacts of the normally closed switch are connected between the contacts 272 and point 184 of the counter. It is through this point 184 that power is supplied to the counter.

In operation, when relay contacts 252 are closed the point 254 is connected to the bus bar 164 which in turn energizes the timer 256 and 264. These timers are both so designed that they will retain their respective contacts in their normal position for a period of time after initial energizing of the timer. Thus it can be seen that once point 254 is connected to bus bar 164 the relay coils 260 and 268 will remain energized for a period of time as determined by the operation of timers 256 and 264, respectively. The timer 256 is set to operate a shorter amount of time than the timer 264 so that the drain valve 70 will be open for a period of time after completion of introduction of water into the measuring and dispensing apparatus 30 to allow the water to drain from the chamber.

It is to be noted that upon completion of the discharge or waste water cycle by a timer 264 that contacts 272 will be open thus disconnecting the bus bar 164 from point 184 of the counter 166. This disconnection of the counter 166 will reset the counter back to its original condition ready for dispensing of another admixture liquid.

It is also to be noted that point 184 is connected through a normally open set of switch contacts 276 to point 278. These normally opened contacts 276 are mechanically connected to the contacts 274 such that when the contacts 274 are closed the contacts 276 are open and conversely, when the contacts 276 are closed the contacts 274 are open. Thus it can be seen by opening the contacts 274 and closing the contacts 276, the wash cycle will be automatically omitted between successive dispensing operations.

In the preceding description only three contacts on each of the selector switches are shown. It is to be understood that additional contacts could be added to the switch and appropriate relays and indicator lights attached to the contacts to allow for the dispensing of admixture from additional tanks.

Operation of the Device

The operation of the device will be described with reference to the FIGURES by describing the measuring and dispensing of admixture liquid from the admixture storage tank number 1, but it is to be understood of course that the procedure of operation of the device would be identical for the dispensing of admixture liquids from the other storage tanks. It is also to be noted that initially all of the valves are closed and the other elements of the system are de-energized.

To remove a desired quantity of liquid into tanks 58 from admixture storage tank 10, the control unit 32 is set to measure the desired quantity from tank 10. Thereafter the control unit through the electrical connector 128 energizes the pump 16 and opens the valve 22 as previously described to allow admixture liquid to be conveyed into the measuring and dispensing apparatus 30. Thereupon, the admixture liquid will enter the cylindrical chamber 80 causing the float 82 to arise as the liquid is accumulated therein. As the float 82 rises in the cylindrical chamber 80, counter weight 96 will pull the chain 88 which in turn will rotate the sprocket 92 and idler pulley 94. The rotation of the sprocket 92 rotates the disc 102 and the magnets 104 mounted thereon. As this disc 102 rotates each magnet will successively pass the mercury switch 108 thus selectively actuating the switch 108 and causing the electrical pulses to be conducted through line 111 to the control unit 32. Control unit 32 appropriately counts these pulses which are directly proportional to the amount of liquid contained in the chamber 80 and will de-energize pump 16 and close the valve 22 when the desired amount of liquid is present in the chamber 80.

Thereafter the apparatus delays for approximately five seconds to allow inspection of the fluid contained in the transparent wall apparatus 30, and thereafter the control unit 32 will energize the pump 46 and will open valve 40 to convey the admixture liquid from chamber 80 through conduits 34, 41, and 52 to the mixing tank 58. This process of conveying the admixture will continue until the float moves back down to the position shown in FIG. 2 whereupon a magnet (not shown) on the counter weight 96 will close the reed switch 110 located near the upper end of the chamber 86 in the second cylindrical body 84. This switch 110 will in turn transmit an electrical pulse through conductor 111 to the control unit 32 which closes valve 40 and de-energizes pump 46 to complete the dispensing operation. Thereafter, if it is desired to dispense an additional quantity of liquid from admixture storage tank 10, the control unit 32 is set for that additional quantity and the process is repeated.

On the other hand, if it is desired to dispense an admixture material from one of the other admixture storage tanks such as admixture storage tank 12, a rinse operation will be started by control unit 32. This rinse operation is initiated by opening valve 64 to cause clean water to flow from the supply 60 through the conduit 66 to a fluid manifold 67 located in the upper extremity of the cylindrical chamber 80. During this rinsing process, the drain valve 70 is open to allow the water to drain from the chamber through conduit 68 to the drain 72. Once this washing operation is completed, the apparatus is ready to dispense and measure liquids from the other admixture storage tanks as desired with a minimum amount of contamination.

Only one complete admixture measuring and dispensing system has been disclosed. It is envisioned however that more than one measuring and dispensing system could be used with each concrete plant to provide for dispensing various quantities of admixture. For example one system could have a maximum capacity per cycle of 380 ounces of admixture liquid. This system could dispense in 5 ounce graduated quantities. The other system could have a maximum quantity of 60 ounces per cycle and could be able to dispense in 1 ounce graduated quantity. By utilizing two systems a large variety of combinations of quantities of dispensed admixtures could be obtained.

Obviously many modifications and variations of the present invention are possible in the light of the above teachings. It is therefore to be understood of course that within the scope of the appended claims, the invention may be practiced by those of ordinary skill in the art otherwise than as is specifically described herein.

I claim:

1. An apparatus for measuring and dispensing liquids from a plurality of different supplies to a common discharge point without contamination between the separate liquids, which comprises:
    a. a receptacle having a chamber for receiving liquid therein,
    b. measuring means operatively associated with said receptacle for measuring the volume of fluid contained in said chamber,
    c. separate pairs of inlet and outlet conduit means corresponding in number to the different supplies of liquid to be measured and dispensed by said apparatus,
    d. a separate inlet conduit connecting each of said supplies to said chamber, selectively operable means on each of said conduits for controlling the flow of said liquids through said conduits to said chamber; and
    e. a plurality of separate outlet conduits corresponding in number to said supplies of liquid connected between said chamber and said discharge point, selectively operable discharge means for controlling the flow of liquid through each of said conduits.

2. A liquid measuring and dispensing apparatus as defined in claim 1 additionally comprising control means operatively associated with said measuring means for controlling the respective inlet and outlet means for said liquids to selectively dispense a quantity of one of said liquids from one of said outlet means.

3. A liquid measuring and dispensing apparatus as defined in claim 2 additionally comprising second control means for controlling the volume of said liquid dispensed from said one of said outlet means.

4. A liquid measuring and dispensing apparatus as defined in claim 1 wherein said measuring means comprises:
    buoyant means in said chamber for floating on said liquid, and feedback means operatively associated with said buoyant means for selectively closing one of said inlet means to prevent flow of liquid into said chamber and for opening one of said outlet means to dispense fluid from said chamber.

5. A liquid measuring and dispensing apparatus as defined in claim 4 wherein said feedback means comprises
    pulley means mounted for rotation about an axis, and;
    connecting means operatively associating said bouyant means and said pulley for rotating said pulley means as the level of said liquid moves said bouyant means; and
    means for sensing the rotation of said pulley.

6. A liquid measuring and dispensing apparatus as defined in claim 20 wherein said means sensing rotation of said pulley comprises a magnetic responsive switch, a plurality of permanent magnets radially spaced and fixed to rotate with said pulley to open and close said switch as said pulley rotates, and a pulse counter connected to said switch to count the pulses created by the opening and closing of said switch.

7. A liquid measuring and dispensing apparatus as defined in claim 21 wherein said line comprises a chain, and wherein said pulley comprises a sprocketed surface for engaging said chain, and wherein said chain passes over said pulley, a counter weight attached to the other end of said chain to hold said chain in tension during movement of the said float, and an enclosure having a chamber therein for receiving said counter weight.

8. An apparatus as defined in claim 1 wherein said inlet means comprises:
   a plurality conduit means interconnecting each of said liquid supplies and said chamber, separate valve means for controlling the flow of liquids through each of said conduits and means for forcing said liquid to flow through each of said conduit means when one of said valve means is in the open position.

9. A liquid measuring and dispensing apparatus as defined in claim 1 wherein said outlet means comprises a plurality of conduits in fluid communication with said chamber, valve means on each conduit for selectively controlling the flow of liquid through each of said conduit means, and means for causing said liquid to discharge from said chamber through one of said conduit means when said valve means is in an open position.

10. A liquid measuring and dispensing apparatus as defined in claim 1 additionally comprising washing means mounted in said chamber for selectively washing the interior of said chamber.

11. A liquid measuring and dispensing apparatus as defined in claim 10 additionally comprising means for sensing the absence of liquid in said chamber and for actuating said washing means.

12. A liquid measuring and dispensing apparatus as defined in claim 10 wherein said washing means comprises:
   manifold means mounted in the upper portion of said chamber, a cleaning liquid supply means in fluid communication with said manifold means, selectively operable valve means for controlling the flow of said cleaning liquid into said manifold, nozzle means in said manifold for directing said cleaning liquid from said manifold onto the interior surface of said chamber, and drain means in said chamber for removing said cleaning liquid from said chamber after it is dispensed from said manifold.

13. A liquid measuring and dispensing apparatus as defined in claim 1 wherein said receptacle is at least partially constructed from transparent material to allow the viewing of said liquids in said chamber.

* * * * *